United States Patent
Werner et al.

(10) Patent No.: US 7,552,186 B2
(45) Date of Patent: Jun. 23, 2009

(54) METHOD AND SYSTEM FOR FILTERING SPAM USING AN ADJUSTABLE RELIABILITY VALUE

(75) Inventors: Carsten Werner, Kassel (DE); Mark Usher, Göttingen (DE)

(73) Assignee: International Business Machines Corporation, Armonk, NY (US)

(*) Notice: Subject to any disclaimer, the term of this patent is extended or adjusted under 35 U.S.C. 154(b) by 812 days.

(21) Appl. No.: 11/150,379

(22) Filed: Jun. 10, 2005

(65) Prior Publication Data

US 2006/0031373 A1 Feb. 9, 2006

Related U.S. Application Data

(60) Provisional application No. 60/583,452, filed on Jun. 28, 2004.

(51) Int. Cl.
*G06F 15/16* (2006.01)
(52) U.S. Cl. .................. 709/207; 709/206; 709/245; 709/246
(58) Field of Classification Search ......... 709/206–207, 709/245–246
See application file for complete search history.

(56) References Cited

U.S. PATENT DOCUMENTS

| | | | | |
|---|---|---|---|---|
| 7,206,814 B2* | 4/2007 | Kirsch | ................... | 709/206 |
| 7,219,148 B2* | 5/2007 | Rounthwaite et al. | ....... | 709/207 |
| 7,287,060 B1* | 10/2007 | McCown et al. | ............ | 709/206 |
| 7,409,540 B2* | 8/2008 | Ingerman et al. | ............ | 709/245 |
| 7,454,195 B2* | 11/2008 | Lewis et al. | ................. | 709/246 |
| 7,475,118 B2* | 1/2009 | Leiba et al. | ................. | 709/206 |
| 2003/0195937 A1 | 10/2003 | Kircher, Jr. et al. | | |
| 2004/0148330 A1 | 7/2004 | Alspector et al. | | |
| 2005/0015455 A1 | 1/2005 | Liu | | |
| 2005/0050222 A1 | 3/2005 | Packer | | |
| 2005/0188036 A1 | 8/2005 | Yasuda | | |

FOREIGN PATENT DOCUMENTS

| WO | WO 98/41919 | 9/1998 |
|---|---|---|
| WO | WO 00/10278 | 2/2000 |

OTHER PUBLICATIONS

Porras et al., "Live Traffic Analysis of TCP/IP Gateways," Internet Society's Networks and Distributed Systems Security Symposium, Mar. 1998, 16 pages. (See p. 7, paragraph 4.3).

* cited by examiner

*Primary Examiner*—Bharat N Barot
(74) *Attorney, Agent, or Firm*—King & Spalding LLP

(57) ABSTRACT

A spam detection system can monitor incoming and outgoing email messages and prevent email messages from being delivered. This spam detection system incorporates a sender ranking system that maintains prior sender's email addresses and an associated reliability value in a database. If an email message is categorized as spam, the system searches to see if the sender is located in the database. If the sender is located in the database and their reliability value is above a certain threshold, the sender's reliability value is decreased and the email message is treated as not spam. If the sender is not located in the database, the email message is discarded as spam. If an email message is not categorized as spam, prior users located in the database will have their reliability values increased, while new users will be entered into the database at a default level.

27 Claims, 2 Drawing Sheets

METHOD AND SYSTEM FOR FILTERING SPAM USING AN ADJUSTABLE RELIABILITY VALUE

RELATED APPLICATION

The present application claims priority under 35 U.S.C. § 119 to a corresponding provisional patent application, U.S. Provisional Patent Application Ser. No. 60/583,452, filed on Jun. 28, 2004. This provisional patent application is hereby fully incorporated herein by reference.

FIELD OF THE INVENTION

The present invention relates to the detection of spam messages. More particularly described, the present invention relates to the increased performance of an existing spam detection system by reducing false positives and over-blocking by implementing a sender ranking system.

BACKGROUND OF THE INVENTION

In the conventional art, a spam detection system analyzes the content of an electronic mail ("email") messages and determines if the email message is unsolicited electronic junk email, also known as "spam", or a legitimate email message. There are different approaches that are well-known in the art to accomplish this task, but none of them are able to work 100% error free. Common spam detection approaches include bayesian classifiers, artificial neuronal networks, and heuristic methods by looking at email headers or searching for typical spam patterns.

For some email messages, the spam detection system will identify the message as spam although the message was not spam. In this instance, it is said that the spam detection system has produced a "false positive." When, in response to a "false positive," a spam detection system blocks the email message, the system suffers from the problem of "overblocking."

In view of the forgoing, there is a need in the art for a spam detection system that reduces the frequency of false positives and overblocking.

SUMMARY OF THE INVENTION

The present invention meets the needs described above by incorporating a sender ranking system into an existing spam detection system to reduce the frequency of false positives and overblocking when monitoring incoming email messages.

The present invention is operative to prevent spam email messages, while allowing legitimate emails to be delivered to their ultimate destination. Incoming email messages are analyzed by a spam detection module which determines whether the email is legitimate or spam.

If the email is classified as spam, the friendly sender detection module of the invention searches its sender ranking database to determine if there is an entry related to the sender. If there is no prior entry for the sender, the email is classified as spam and the message is prevented from being delivered. However, if there is an entry in the sender ranking database for this sender, the friendly sender detection module of the invention determines if the sender is "friendly" by examining the sender's reliability value stored in the database and comparing the value to a predetermined threshold. For values above the predetermined threshold, the sender is classified as "friendly" and the email message is classified as "not spam" and delivered to its ultimate destination. However, the sender's reliability value is decreased because the spam detection module initially classified the email message as spam, For values below the predetermined threshold, the sender is classified as "not friendly", the sender's reliability value is decreased, and the email message is classified as spam and prevented from being delivered.

For emails that are classified as not spam by the spam detection module, the invention searches its sender ranking database to determine if there is an entry related to the sender. If the sender is already located in the sender ranking database, the sender's reliability value is increased and the email message is classified as not spam and delivered to its ultimate destination. If the sender is not located in the sender ranking database, the sender is added to the database with a default reliability value and the email message is classified as not spam and delivered to its ultimate destination.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

The present invention is directed to the prevention of delivery of spam email messages by incorporating a sender ranking system and database into an existing spam detection system to reduce the frequency of overblocking legitimate emails.

Briefly described, a spam detection system is installed at the gateway between the Internet and an internal network. An exemplary model of the spam detection system comprises a spam detection module, friendly sender detection module, sender ranking database, and a sender ranking database updating module. Initially, the spam detection module classifies an incoming mail message as either spam or not spam.

If the email is classified as spam, the friendly sender detection module determines if the sender is "friendly" by searching the sender ranking database for the sender and its associated reliability value. If the sender is not located in the sender ranking database, the email message is declared as spam. If the sender is located in the sender ranking database, the sender's reliability is compared to a predefined threshold. If the sender's reliability value is greater than the predefined threshold, the sender's reliability value is decreased because the email message was initially declared as spam, and the email message is declared as not spam. However, if the sender's reliability value is less than the predefined threshold, the sender's reliability value is decreased and the email message is declared as spam.

Initially, if the email message is classified as not spam, the system searches the sender ranking database for the sender. If the sender is located in the sender ranking database, the sender's reliability value is increased and the email message is declared as not spam. If the sender is not located in the sender ranking database, the sender is added to the sender ranking database; given a default reliability value; and the email message is declared as not spam.

In general, conventional spam detection systems suffer from the problem of overblocking legitimate email messages by mistakenly classifying them as spam. Advantageously, the present invention has the ability to reduce the frequency of overblocking by the inclusion of a sender ranking system.

Figure 1:
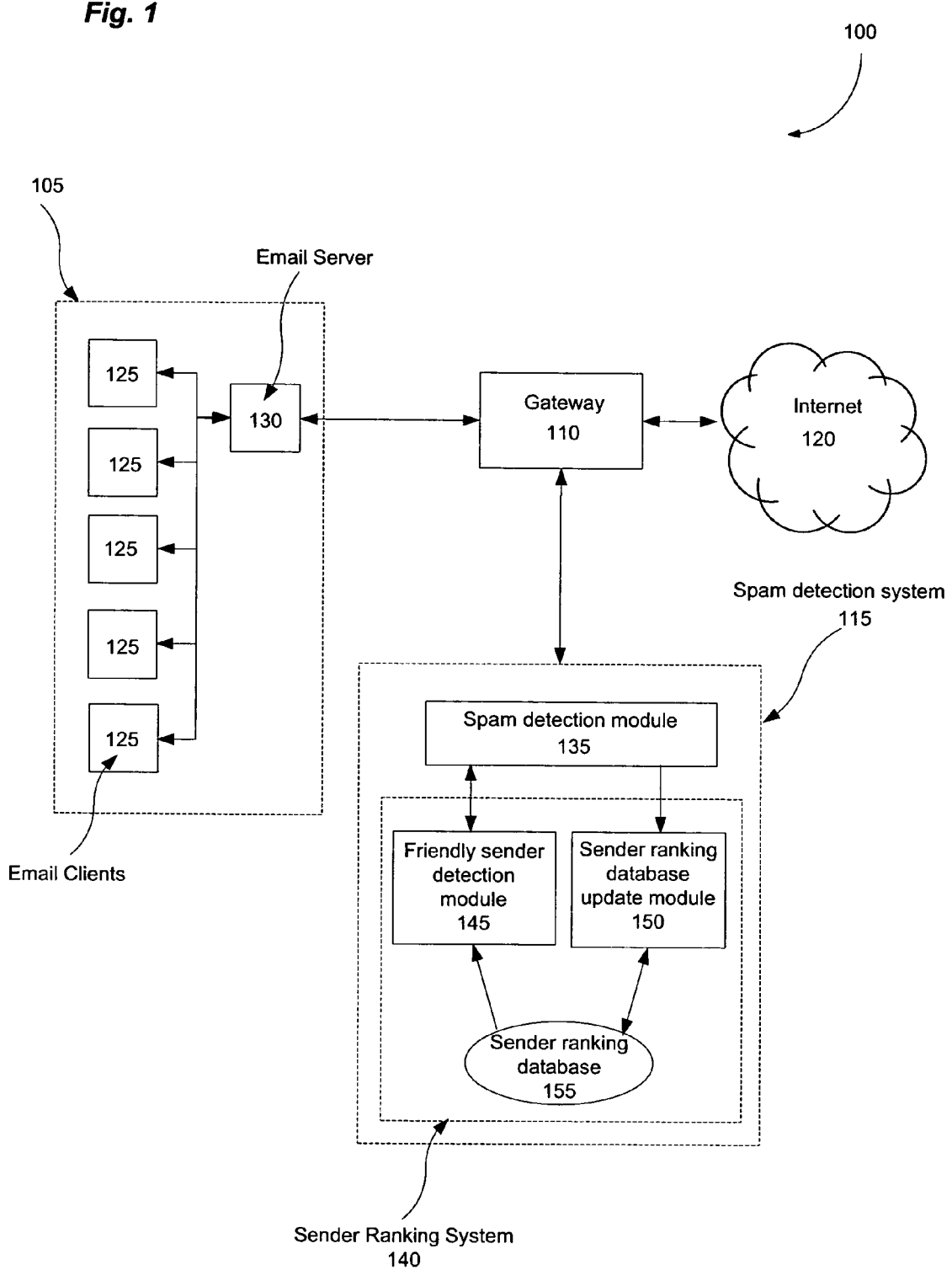
FIG. 1 is a block diagram illustrating the operating environment of a spam detection system constructed in accordance with an exemplary embodiment of the present invention.

Referring now to the drawings, in which like numerals represent like elements, aspects of the exemplary embodiments will be described in connection with the drawing set. FIG. 1 is a block diagram illustrating the operating environment 100 of a spam detection system 115 constructed in accordance with an exemplary embodiment of the present invention. The exemplary spam detection system 115 is positioned at the gateway 110 between an external network, such as the internet 120, and an internal network 105. In the internal network 105, an email server 130 can receive emails from the Internet 120 or can send emails via the Internet 120. Further, the email server 130 communicates via the internal network 105 with email clients 125. The spam detection system 115 can analyze the email traffic between the intranet 105 and the Internet 120 using SMTP (Simple Mail Transfer Protocol).

The spam detection system 115 receives emails from the gateway 110 into a spam detection module 135. The spam detection module 135 analyzes the content of the email messages and determines whether the email message is spam or not. Conventional spam detection methodologies include bayesian classifiers, artificial neuronal networks, heuristic methods that look at email headers, or searches for typical spam patterns to determine whether the email message represents spam. Each of these conventional approaches can be used in this exemplary spam detection system 115; alternative known spam detection approaches could also be used by the exemplary spam detection system.

After the spam detection module 135 determines whether the email message is spam or not, the decision is passed to the sender ranking system 140. The exemplary sender ranking system 140 comprises a friendly sender detection module 145, a sender ranking database 155, and a sender ranking database updating module 150. The friendly sender detection module 145 determines whether the sender of the email message that was classified as spam is considered a "friendly sender." The sender of an email message is classified as a "friendly sender" by searching the sender ranking database 155 for an entry. The sender ranking database 155 maintains a list of stored email addresses. For example, the sender ranking database 155 can include email addresses processed by the spam detection system 115 in the past as well as any sender information imported from an external database or address book. The sender ranking database 155 also maintains a reliability value associated with each email address that is used to classify the sender as "friendly" or not.

Email addresses in the sender ranking database 155 may be stored in a variety of different formats. For example, email addresses may be stored in a readable form such as doe@example.com. In another exemplary embodiment, a key value is calculated by enumerating each letter of the alphabet with two digits. For example, the system converts each letter of the address to a corresponding number (i.e., a=01, b=02, c=03, . . . , and z=26). Therefore, doe@example.com would be converted to 0415050524011316120503153. In another exemplary embodiment, a hash value is calculated by using the HMAC-MD5 algorithm described in the RFCs (Requests for Comments) 2104, 1321 and 2403. In another exemplary embodiment, only a portion of an email address, such as the sender domain, may be stored in the sender ranking database.

The sender ranking database updating module 150 is responsible for updating the reliability value associated with a sender in the sender ranking database 155. The sender ranking database updating module 150 can decrease the reliability value of a sender for sending a spam email message or it can increase the reliability value of a sender for sending a legitimate email.

Figure 2:
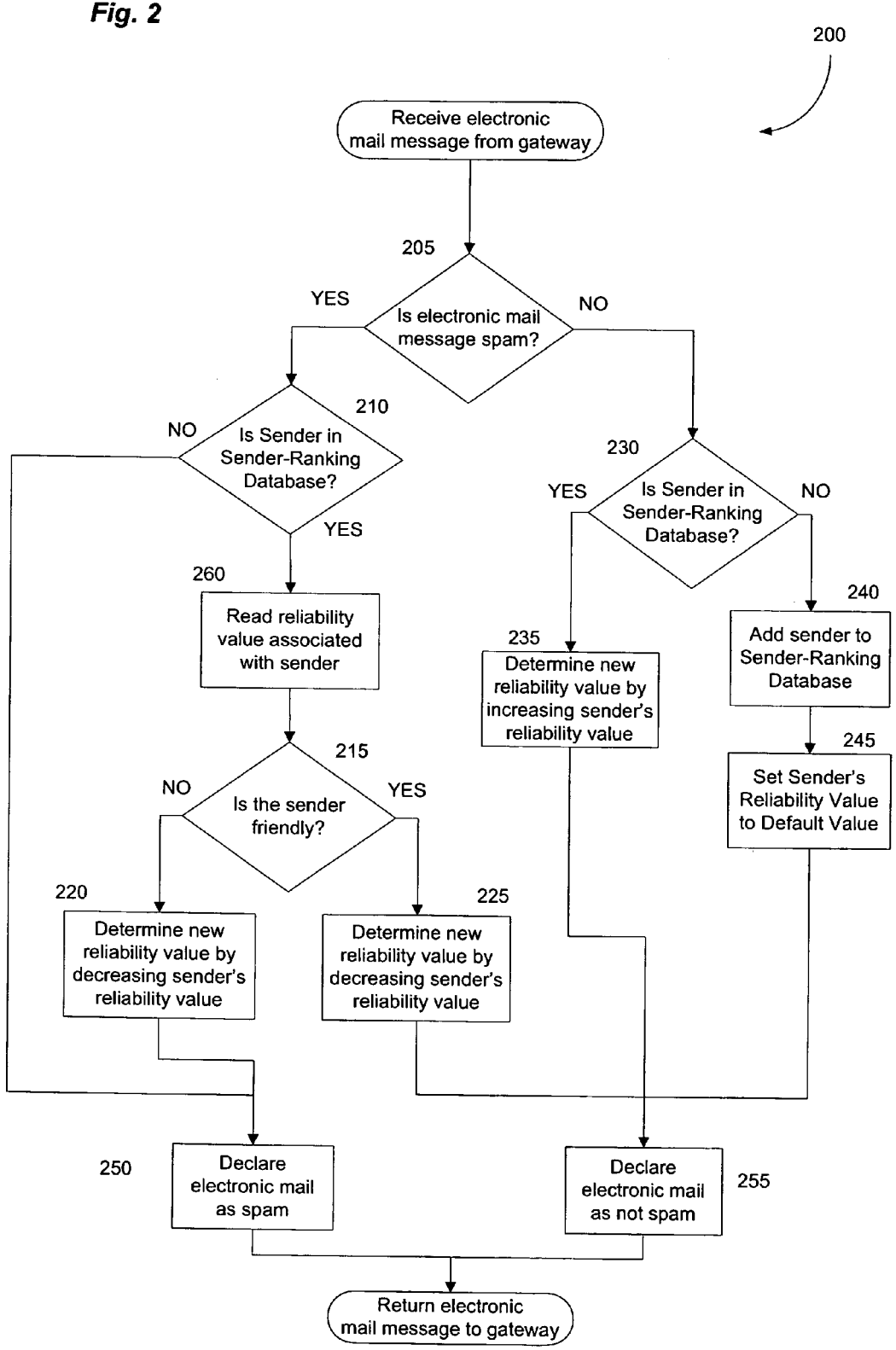
FIG. 2 is a flow chart depicting an exemplary method for increasing the performance of an existing spam detection system by incorporating a sender ranking system in accordance with an exemplary embodiment of the present invention.

FIG. 2 is a flow chart depicting an exemplary method 200 for increasing the performance of a spam detection system by incorporating a sender ranking system 140 in accordance with an exemplary embodiment of the present invention. The exemplary method 200 begins when a spam detection module 135 receives an email message from the gateway 110. In Step 205, the spam detection module 135 determines whether the email message is spam or a legitimate email message. If the spam detection module 135 determines the email message is spam, the method proceeds to Step 210; otherwise, the method proceeds to Step 230.

After the spam detection module 135 has classified the email message as spam in Step 205, the friendly sender detection module 145 determines whether the sender of the email is located in the sender ranking database 155 in Step 210. The friendly sender detection module 145 searches the sender ranking database 155 for an entry for the current sender. The sender ranking database 155 maintains a list that includes prior senders' email addresses and a reliability value associated with each sender's email address. If the sender ranking database 155 does not contain an entry with the email address for the current sender, the method 200 declares the email message as spam in Step 250 and the email message is returned to the gateway 110. However, if there is an entry stored in the sender ranking database 155 the method proceeds to Step 215.

In Step 215, the friendly sender detection module 145 determines whether the sender of the email message is "friendly" or not. To make this determination, the friendly sender detection module 145 reads the sender's reliability value from the sender ranking database 155 in Step 260. The friendly sender detection module 145 compares the reliability value associated with the sender's email address to a predefined threshold. If the sender's reliability value is higher than the predefined threshold, the sender of the email message is treated as a "friendly sender." In this scenario, the sender ranking system 140 determines that the spam detection module 135 has incorrectly identified that the email message as spam; therefore, the sender ranking system 140 overwrites the decision of the spam detection module 135 and classifies the message as not spam in Step 255. However, because the spam detection module 135 has classified the email message as spam, the sender's reliability value is decreased in Step 225 by the sender ranking database updating module 150. If the friendly sender detection module 145 determines that the sender is not "friendly" in Step 215, the sender's reliability value is decreased in Step 220 by the sender ranking database updating module 150 and the email message is classified as spam in Step 250.

Returning to Step 205, if the spam detection module 135 determines that the email message is not spam, the method proceeds to Step 230. In Step 230, the sender ranking database 155 is searched to determine whether there is an entry for the sender of the email message. If the sender's email address is located in the sender ranking database 155, the sender's reliability value is increased in Step 235 by the sender ranking database updating module 150, and the email message is classified as not spam in Step 255. However, if the sender's email address is not located in the sender ranking database 155, an entry for the sender is created in the sender ranking database 155 in Step 240 by adding the sender's email address to the database. Furthermore, the sender's reliability value is set to a default value in Step 245 by the sender ranking database updating module 150 and associated with the sender's email address in the database. After the reliability value is set to the default value, the email message is classified as not spam in Step 255.

In Steps 220, 225, 235, and 245, the sender's reliability value is either decreased, increased, or set to a default value by the sender ranking database updating module 150. In order to illustrate how an exemplary embodiment of the sender ranking database updating module 150 updates the reliability values, the following variables will be defined for illustrative purposes in Table 1.

TABLE 1

'a' is a value between 0 and 1 (for example, a = $^6/_7$)
'f' is a real number > 0 (for example, f = 1)
'v_old' is the actual reliability value
'v_new' is the new updated reliability value
'x1' is a predefined number > 0 (for example, x1 = 0.1)
'x2' is a predefined number > 0 (for example, x2 = 0.1)
'v_max' is the maximum possible reliability value (for example, v_max = 1)
'v_min' is the minimum possible reliability value (for example, v_min = 0)

In Step 215, the friendly sender detection module 145 determines whether a sender is "friendly" by comparing the sender's reliability value to a predefined threshold. In an exemplary embodiment, the formula for determining the threshold value is (v_min+v_max)/2. In Steps 220 and 225, the sender's reliability value is decreased in response to the spam detection module 135 classifying the email message as spam. In one exemplary embodiment, the formula for calculating the new decreased reliability value is v_new=a*v_old. In an alternative exemplary embodiment, the formula for calculating the new decreased reliability value is v_new=maximum(v_min, v_old-x2).

In Step 235, the sender's reliability value is increased in response to the spam detection module 135 classifying the email message as spam. In one exemplary embodiment, the formula for calculating the new increased reliability value is v_new =f*(1-a)+a*v_old. In an alternative exemplary embodiment, the formula for calculating the new increased reliability value is v_new=minimum(v_max, v_old+x1).

In Step 245, the sender ranking database update module 150 sets a newly added sender's reliability value to a default value. In an exemplary embodiment, the formula for setting the initial reliability value is v_new=f*(1-a)+a*v_min.

It should be understood that the foregoing relates only to illustrative embodiments of the present invention, and that numerous changes may be made therein without departing from the scope and spirit of the invention as defined by the following claims.

What is claimed:

1. A computer implemented method for evaluating electronic mail messages, comprising the steps of:
   identifying an electronic mail message from a particular sender as spam;
   determining whether the particular sender of the electronic mail message identified as spam is stored in a database comprising:
   a plurality of electronic mail addresses; and
   a plurality of current reliability values, each associated with one of the electronic mail addresses;
   reading from the database the current reliability value associated with the electronic mail address of the particular sender stored in the database;
   determining whether the current reliability value associated with the electronic mail address of the particular sender is greater than a predefined threshold;
   calculating a new reliability value for the electronic mail address of the particular sender by decreasing the particular sender's current reliability value in response to the determination that the current reliability value associated with the particular sender is greater than a predefined threshold; and
   changing the identification of the electronic mail message to not spam in response to the determination that the current reliability value associated with the particular sender is greater than the predefined threshold.

2. The method of claim 1, further comprising the step of:
   accepting the email message for presentation in response to changing the identification of the electronic mail message to not spam.

3. The method of claim 1, wherein the step of calculating a new reliability value by decreasing the particular sender's current reliability value is calculated by multiplying the sender's current reliability value by a predefined real number between zero and one.

4. The method of claim 1, wherein the step of calculating a new reliability value by decreasing the particular sender's current reliability value is determined by choosing the greater value between the minimum possible reliability value and the current reliability value minus a predefined value.

5. The method of claim 1 further comprising the step of:
   calculating a new reliability value by decreasing the particular sender's current reliability value in response to the determination that the current reliability value is less than the predefined threshold.

6. The method of claim 1 further comprising the steps of:
   identifying an electronic mail message from a particular sender as not spam;
   determining whether the electronic mail address of the particular sender of the electronic mail message identified as not spam is stored in the database;
   calculating a new reliability value by increasing the particular sender's current reliability value for the electronic mail address of the particular sender of an electronic mail message stored in the database.

7. The method of claim 6, wherein the step of calculating a new reliability value by increasing the particular sender's current reliability value is determined by the formula v_new=f*(1-a)=a*v_old, wherein
   v_new is the new reliability value;
   f is a real number greater than zero;
   a is a real number between zero and one; and
   v_old is the current reliability value.

8. The method of claim 6, wherein the step of calculating a new reliability value by increasing the particular sender's current reliability value is determined by choosing the lesser value between the maximum possible reliability value and the current reliability value plus a predefined value.

9. The method of claim 1 further comprising:
   identifying an electronic mail message from a particular sender as not spam;
   determining whether the particular sender of the electronic mail message identified as not spam is stored in the database; and creating a new entry in the database for the electronic mail address of the particular sender of the electronic mail message that is not stored in the database.

10. The method of claim 9, wherein the step of creating a new entry comprises:
adding the particular sender's electronic mail address to the database;
determining the particular sender's default reliability value; and
associating the particular sender's electronic mail address with the particular sender's default reliability value.

11. The method of claim 9, wherein the step of determining the particular sender's default reliability value is calculated by using the formula v_new=f*(1−a)=a*v_min, wherein
v_new is the default reliability value;
f is a real number greater than 0;
a is a real number between zero and one; and
v_min is the minimum possible reliability value.

12. A system for filtering unsolicited electronic mail messages, comprising:
a spam detection module operative to identify an electronic mail message from a particular sender as spam;
a sender ranking database comprising:
a plurality of electronic mail addresses; and
a plurality of current reliability values, each associated with one of the electronic mail addresses;
the friendly sender detection module operative to:
reading the current reliability value associated with the electronic mail address of the particular sender stored in the sender ranking database; and
determining whether the current reliability value associated with the electronic mail address of the particular sender is less than a predefined threshold; and
a sender ranking database update module operative to calculating a new reliability value for the electronic mail address of the particular sender by decreasing the particular sender's current reliability value in response to the determination that the current reliability value associated with the electronic mail address of the particular sender is less than a predefined threshold.

13. The system of claim 12, wherein the sender ranking database update module is operative to perform the step of calculating a new reliability value by decreasing the particular sender's current reliability value which is calculated by multiplying the sender's current reliability value by a predefined real number between zero and one.

14. The system of claim 12, wherein the sender ranking database update module is operative to perform the step of calculating a new reliability value by decreasing the particular sender's current reliability value which is determined by choosing the greater value between the minimum possible reliability value and the current reliability value minus a predefined value.

15. The system of claim 12, wherein the sender ranking database update module is operative to perform the step of calculating a new reliability value by decreasing the particular sender's current reliability value in response to the determination that the current reliability value is greater than the predefined threshold.

16. The system of claim 12, wherein
the spam detection module identifies an electronic mail message from a electronic mail address of the particular sender as not spam;
the friendly sender detection module determines whether the electronic mail address of the particular sender of the electronic mail message identified as not spam is stored in the sender ranking database;
the sender ranking database update module is operative to perform the step of calculating a new reliability value by increasing the particular sender's current reliability value for the electronic mail address of the particular sender of an electronic mail message stored in the database.

17. The system of claim 16, wherein the sender ranking database update module is operative to perform the step of calculating a new reliability value by increasing the particular sender's current reliability value by the formula v_new=f*(1−a)=a*v_old, wherein
v_new is the new reliability value;
f is a real number greater than zero;
a is a real number between zero and one; and
v_old is the current reliability value.

18. The system of claim 16, wherein the sender ranking database update module is operative to perform the step of calculating a new reliability value by increasing the particular sender's current reliability value which is determined by choosing the lesser value between the maximum possible reliability value and the current reliability value plus a predefined value.

19. The system of claim 12 further comprising:
the spam detection module identifying an electronic mail message from the electronic mail address of the particular sender as not spam;
the friendly sender detection module determining whether the electronic mail address of the particular sender of the electronic mail message identified as not spam is stored in the sender ranking database; and
the sender ranking database update module operative to perform the step of creating a new entry in the database for the electronic mail address of the particular sender of the electronic mail message that is not stored in the database.

20. The system of claim 19, wherein the step of creating a new entry comprises:
adding the particular sender's electronic mail address to the sender ranking database;
determining the particular sender's default reliability value; and
associating the particular sender's electronic mail address with the particular sender's default reliability value.

21. The system of claim 20, wherein the sender ranking database update module is operative to perform the step of determining the particular sender's default reliability value using the formula
v_new=f*(1−a)=a*v_min, wherein
v_new is the default reliability value;
f is a real number greater than 0;
a is a real number between zero and one; and
v_min is the minimum possible reliability value.

22. A computer implemented method for filtering unsolicited electronic mail messages, comprising the steps of:
identifying an electronic mail message from a particular sender as not spam;
determining whether the particular sender of the electronic mail message identified as not spam is stored in a database comprising:
a plurality of electronic mail addresses; and
a plurality of current reliability values, each associated with one of the electronic mail addresses;
reading from the database the current reliability value associated with the electronic mail address of the particular sender stored in the database; and
calculating a new reliability value by increasing the particular sender's current reliability value for the electronic mail address of the particular sender of the electronic mail message stored in the database.

23. The method of claim 22, wherein the step of calculating a new reliability value by increasing the particular sender's current reliability value is determined by the formula v_new=f*(1−a)=a*v_old wherein v_new is the new reliability value;
f is a real number greater than zero;
a is a real number between zero and one; and
v_old is the current reliability value.

24. The method of claim 22, wherein the step of calculating a new reliability value by increasing the particular sender's current reliability value is determined by choosing the lesser value between the maximum possible reliability value and the current reliability value plus a predefined value.

25. A computer implemented method for evaluating electronic mail messages, comprising the steps of:

identifying an electronic mail message from the electronic mail address of the particular sender as spam;
determining whether the electronic mail address of the particular sender of the electronic mail message identified as spam is stored in a database comprising:
a plurality of electronic mail addresses; and
a plurality of current reliability values, each associated with one of the electronic mail addresses;
reading the current reliability value associated with the electronic mail address of the particular sender stored in the database;
determining whether the current reliability value associated with the electronic mail address of the particular sender is less than a predefined threshold;
calculating a new reliability value for the electronic mail address of the particular sender by decreasing the particular sender's current reliability value in response to the determination that the current reliability value associated with the electronic mail address of the particular sender is less than a predefined threshold; and
leaving the identification of the electronic mail message as spam in response to the determination that the current reliability value associated with the electronic mail address of the particular sender is less than the predefined threshold.

26. The method of claim 25, wherein the step of calculating a new reliability value by decreasing the particular sender's current reliability value is calculated by multiplying the sender's current reliability value by a predefined real number between zero and one.

27. The method of claim 25, wherein the step of calculating a new reliability value by decreasing the particular sender's current reliability value is determined by choosing the greater value between the minimum possible reliability value and the current reliability value minus a predefined value.

* * * * *